United States Patent
Guido et al.

(10) Patent No.: US 11,480,793 B2
(45) Date of Patent: Oct. 25, 2022

(54) SYSTEMS, DEVICES, AND METHODS FOR ALIGNING A LENS IN A LASER PROJECTOR

(71) Applicant: GOOGLE LLC, Mountain View, CA (US)

(72) Inventors: Vanessa Lynn Louisa Guido, Kitchener (CA); Matthew Bailey, Kitchener (CA); Lloyd Frederick Holland, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 464 days.

(21) Appl. No.: 16/661,185

(22) Filed: Oct. 23, 2019

(65) Prior Publication Data

US 2020/0133001 A1 Apr. 30, 2020

Related U.S. Application Data

(60) Provisional application No. 62/750,091, filed on Oct. 24, 2018.

(51) Int. Cl.
| | |
|---|---|
| *G02B 27/01* | (2006.01) |
| *G02B 27/42* | (2006.01) |
| *G03B 21/14* | (2006.01) |
| *G02B 26/10* | (2006.01) |
| *G03B 21/20* | (2006.01) |
| *G01B 11/27* | (2006.01) |
| *G02B 7/04* | (2021.01) |

(52) U.S. Cl.
CPC ........ *G02B 27/0172* (2013.01); *G01B 11/272* (2013.01); *G02B 7/04* (2013.01); *G02B 26/101* (2013.01); *G02B 27/4205* (2013.01); *G03B 21/142* (2013.01); *G03B 21/2033* (2013.01); *G02B 2027/0112* (2013.01); *G02B 2027/0174* (2013.01); *G03B 21/2013* (2013.01)

(58) Field of Classification Search
CPC .. G02B 27/0172; G02B 27/4205; G02B 7/04; G02B 26/101; G02B 2027/0112; G02B 2027/0174; G01B 11/272; G03B 21/142; G03B 21/2033; G03B 21/2013
USPC .......................................................... 359/13
See application file for complete search history.

(56) References Cited

U.S. PATENT DOCUMENTS

| | | | | |
|---|---|---|---|---|
| 4,945,529 A | * | 7/1990 | Ono ..................... | G11B 7/1353 |
| 5,016,954 A | * | 5/1991 | Onayama ................ | G02B 5/32 |
| | | | | 359/569 |
| 5,212,375 A | * | 5/1993 | Goto ....................... | G02B 5/32 |
| | | | | 250/201.7 |
| 5,453,854 A | * | 9/1995 | Gerbe .................... | G01B 11/26 |
| | | | | 359/13 |

(Continued)

FOREIGN PATENT DOCUMENTS

FR    2698994 A1  *  6/1994   ............ G02B 27/01

*Primary Examiner* — Collin X Beatty

(57) ABSTRACT

Systems, devices, and methods to perform alignment in a projector are described. Laser light emitted is directed to at least one lens, which directs the laser light to a diffractive optical element (DOE), which produces a diffracted light. A sensor measures a property of the diffracted light, and a position of at least one lens adjusted to improve a quality of the diffracted light. The lens is fixed in position to the improvement in the quality of diffracted light achieving a defined threshold. The characteristic may include brightness.

20 Claims, 7 Drawing Sheets

(56) References Cited

U.S. PATENT DOCUMENTS

| | | | | |
|---|---|---|---|---|
| 5,471,046 A * | 11/1995 | Meyers | ............ | G02B 7/28 |
| | | | | 250/201.7 |
| 5,569,904 A * | 10/1996 | Meyers | ............ | G02B 7/32 |
| | | | | 250/201.8 |
| 6,208,465 B1 * | 3/2001 | Schaham | ............ | G06K 7/12 |
| | | | | 359/566 |
| 10,788,316 B1 * | 9/2020 | Kalscheur | ............ | G01S 7/4972 |
| 2014/0307307 A1 * | 10/2014 | Georgiou | ............ | G01B 11/25 |
| | | | | 359/558 |
| 2016/0147081 A1 * | 5/2016 | Kilcher | ............ | G02B 26/101 |
| | | | | 359/13 |

* cited by examiner

SYSTEMS, DEVICES, AND METHODS FOR ALIGNING A LENS IN A LASER PROJECTOR

CROSS-REFERENCE TO RELATED APPLICATIONS

This application claims the benefit of U.S. Provisional Application No. 62/750,091, filed Oct. 24, 2018, titled "Systems, Devices, and Methods for Aligning a Lens in a Laser Projector," the content of which is incorporated herein in its entirety by reference.

TECHNICAL FIELD

The present systems, devices, and methods generally relate to laser projectors and particularly relate to aligning lenses in laser projectors.

BACKGROUND

Description of the Related Art

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames.

A challenge in the design of wearable heads-up displays is to minimize the bulk of the face-worn apparatus will still providing displayed content with sufficient visual quality. There is a need in the art for wearable heads-up displays of more aesthetically-appealing design that are capable of providing high-quality images to the user without limiting the user's ability to see their external environment.

Laser Projectors

A projector is an optical device that projects or shines a pattern of light onto another object (e.g., onto a surface of another object, such as onto a projection screen) in order to display an image or video on that other object. A projector necessarily includes a light source, and a laser projector is a projector for which the light source comprises at least one laser. The at least one laser is temporally modulated to provide a pattern of laser light and usually at least one controllable mirror is used to spatially distribute the modulated pattern of laser light over a two-dimensional area of another object. The spatial distribution of the modulated pattern of laser light produces an image at or on the other object. In conventional laser projectors, the at least one controllable mirror may include: a single digital micromirror (e.g., a microelectromechanical system ("MEMS") based digital micromirror) that is controllably rotatable or deformable in two dimensions, or two digital micromirrors that are each controllably rotatable or deformable about a respective dimension, or a digital light processing ("DLP") chip comprising an array of digital micromirrors.

Manufacture of a wearable heads-up displays typically requires projector alignment. The projector needs to be aligned with the display element (hologram, light guide, etc.) of the wearable heads-up display to ensure that the image formed by the laser projector is visible to the user at a desired location within the field of view of the user. Laser projectors may contain more than one laser light source to allow full-color images to be displayed by the projector, where each laser light source projects a portion of an image and the combined light of all laser light sources forms a single image. A full-color laser projector typically contains a red, a green, and a blue laser light source. Each laser light source in the laser projector needs to be aligned with the display element of the wearable heads-up display and must also be aligned with each other laser light source within the projector to ensure that the projector forms a single image, rather than multiple overlapping images.

BRIEF SUMMARY

A method to perform alignment projector alignment may be summarized as including directing laser light emitted by at least one laser light source to at least one lens, directing the laser light by the at least one lens to a diffractive optical element ("DOE"), diffracting the laser light by the DOE to form a diffracted light, measuring a property of the diffracted light with a light sensor, in response to the measured property of the diffracted light being outside a specified range, adjusting a position of the at least one lens to optimize a quality of the diffracted light, and, in response to the measured property of the diffracted light being inside the specified range, fixing the at least one lens at a current position.

Diffracting the laser light by the DOE to form a diffracted light may include applying a holographic optical function to the diffracted light; and measuring a property of the diffracted light with the light sensor may include measuring a property of the diffracted light to which the holographic optical function has been applied. Applying a holographic optical function to the diffracted light may include applying an optical function chosen from a group comprising one or more of: converging the diffracted light, diverging the diffracted light, and collimating the diffracted light.

Adjusting a position of the at least one lens to optimize a quality of the diffracted light may include adjusting at least one of: the position of the at least one lens in a first dimension, the position of the at least one lens in a second dimension perpendicular to the first dimension, the position of the at least one lens in a third dimension perpendicular to the first dimension and perpendicular to the second dimension, the angle θ of the lens measured relative to a first axis, the angle $\phi$ of the at least one lens measured relative to a second axis perpendicular to the first axis, and the angle $\psi$ of the at least one lens measured relative to a third axis perpendicular to the first axis and perpendicular to the second axis.

Adjusting a position of the at least one lens to optimize a quality of the diffracted light may include adjusting the position of the at least one lens to maximize a brightness of the diffracted light. Adjusting a position of the at least one lens to optimize a quality of the diffracted light may include adjusting the position of the at least one lens to minimize a variation of a brightness of the diffracted light across a region of the sensor. Adjusting a position of the at least one lens to optimize a quality of the diffracted light may include adjusting the position of the at least one lens to maintain a brightness of the diffracted light within a brightness range, the brightness range delimited by a nominal minimum brightness and a nominal maximum brightness. Directing the light from the at least one lens to a DOE may include directing the laser light from the at least one lens to a dynamic mirror and directing the laser light from the dynamic mirror to the DOE.

Directing the laser light from the dynamic mirror to the DOE may include directing the laser light from the dynamic mirror to a splitter and directing the laser light from the splitter to the DOE; directing the laser light from the splitter to the DOE may include splitting the laser light into at least two portions of light; and wherein each portion of light may comprise an exit pupil. Measuring a property of the diffracted light may include measuring a property of the at least two portions of light; and adjusting a position of the at least one lens to optimize a quality of the diffracted light may include adjusting a position of the at least one lens to optimize the quality of the at least two portions of light.

Directing the laser light by the dynamic mirror to the DOE may include sweeping across a two-dimensional area of the DOE with the laser light; diffracting the laser light by the DOE to form a diffracted light may include diffracting the laser light by the two-dimensional area of the DOE to form a diffracted light; and measuring a property of the diffracted light with a light sensor may include measuring a property of the diffracted light across a two-dimensional area of the light sensor. The two-dimensional area of the light sensor may comprise at least one set of pixels; each of the at least one sets of pixels has a respective pixel resolution; and adjusting a position of the at least one lens to optimize a quality of the diffracted light may include adjusting the position of the at least one lens to maximize each pixel resolution of the at least one set of pixels. Sweeping across a two-dimensional area of the DOE with laser light may include scanning a raster across the DOE, and wherein measuring a property of the diffracted light with a light sensor may include measuring a property of the diffracted light scanned across the two-dimensional area of the light sensor as a raster. Sweeping across a two-dimensional area of the DOE with laser light may include sweeping a Lissajous curve across the DOE, and wherein measuring a property of the diffracted light with a light sensor may include measuring a property of the diffracted light swept across the two-dimensional area of the light sensor as a Lissajous curve.

Directing the laser light by the at least one lens to the DOE may include directing the laser light by the at least one lens to a beam combiner and directing the laser light by the beam combiner to the DOE. The method may further comprise directing the diffracted light from the DOE to the light sensor.

Directing laser light emitted by the at least one laser light source to at least one lens may include: directing an initial laser light emitted by an initial laser light source to an initial lens, and directing at least one additional laser light emitted by at least one additional laser light source to at least one additional lens; directing the laser light from the at least one lens to a DOE may include: directing the initial laser light from the initial lens to the DOE, and directing the at least one additional laser light from the at least one additional lens to the DOE; diffracting the laser light by the DOE to form a diffracted light may include: diffracting the initial laser light by the DOE to form an initial diffracted light, and diffracting the at least one additional laser light by the DOE to form at least one additional diffracted light; measuring a property of the diffracted light with the light sensor may include: measuring a property of the initial diffracted light with the light sensor, and measuring a property of the at least one additional diffracted light with the light sensor; adjusting a position of the at least one lens to optimize a quality of the diffracted light may include: adjusting the position of the initial lens to optimize the quality of the initial laser light, and adjusting the position of the at least one additional lens to optimize the quality of the at least one additional laser light; and fixing the position of the at least one lens may include fixing the position of the initial lens and fixing the position of the at least one additional lens.

Adjusting a position of the at least one lens to optimize a quality of the diffracted light may include adjusting the position of the at least one additional lens to maximize an overlap between the initial laser light and the at least one additional laser light. The initial laser light may comprise light of an initial wavelength; each of the at least one additional laser light comprise light with a respective additional wavelength; the at least one DOE may comprise a wavelength-multiplexed hologram; diffracting the laser light by the DOE to form a diffracted light may include: diffracting the initial laser light by the wavelength-multiplexed hologram to form an initial diffracted light; and diffracting the at least one additional laser light by the wavelength-multiplexed hologram to form at least one additional diffracted light.

Diffracting the laser light by the DOE to form a diffracted light may include at least one of: directing the diffracted light into a light guide, and directing the diffracted light out of the light guide.

A method to perform projector alignment may be summarized as including directing laser light along an optical path, the optical path extending between a laser and a sensor, and passing through: a diffractive optical element ("DOE"); and at least one lens of the projector, the at least one lens which is selectively positionable along the optical path between the laser and the sensor, the sensor responsive to at least one property of the laser light; measuring the at least one property of the laser light by the sensor; and determining whether to adjust a position of the at least one lens or to fix the at least one lens in a current position based at least one part on the measurement of the at least one property of the laser light by the sensor.

Determining whether to adjust a position of the at least one lens or to fix the at least one lens in a current position based at least one part on the measurement of the at least one property of the laser light by the sensor may comprise: determining whether the at least one property of the laser light measured by the sensor is within a specified range; and adjusting the current position of the at least one lens in response to a determination that the at least one property of the laser light measured by the sensor is out of the specified range.

Determining whether to adjust a position of the at least one lens or to fix the at least one lens in a current position based at least one part on the measurement of the at least one property of the laser light by the sensor further may comprise: fixing the at least one lens in the current position of the at least one lens in response to a determination that the at least one property of the laser light measured by the sensor is in the specified range.

The method may further comprise iteratively repeating the directing, the measuring and the determining whether to adjust a position of the at least one lens or to fix the at least one lens in a current position based at least one part on the measurement of the at least one property of the laser light by the sensor until the at least one property of the laser light measured by the sensor is in the specified range.

Adjusting the current position of the at least one lens may include adjusting the at least one lens in a manner chosen from a group comprising any one or more of: lateral displacement of the lens in a first dimension, lateral displacement of the lens in a second dimension perpendicular to the first dimension, lateral displacement of the lens in a third dimension perpendicular to the first dimension and perpendicular to the second dimension, angular displacement of the lens around a first axis wherein the first axis is aligned along a first dimension, angular displacement of the lens around a second axis wherein the second axis is aligned along a second dimension perpendicular to the first dimension, and angular displacement around of the lens around a third axis wherein the third axis is aligned along a third dimension perpendicular to the first dimension and perpendicular to the second dimension.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
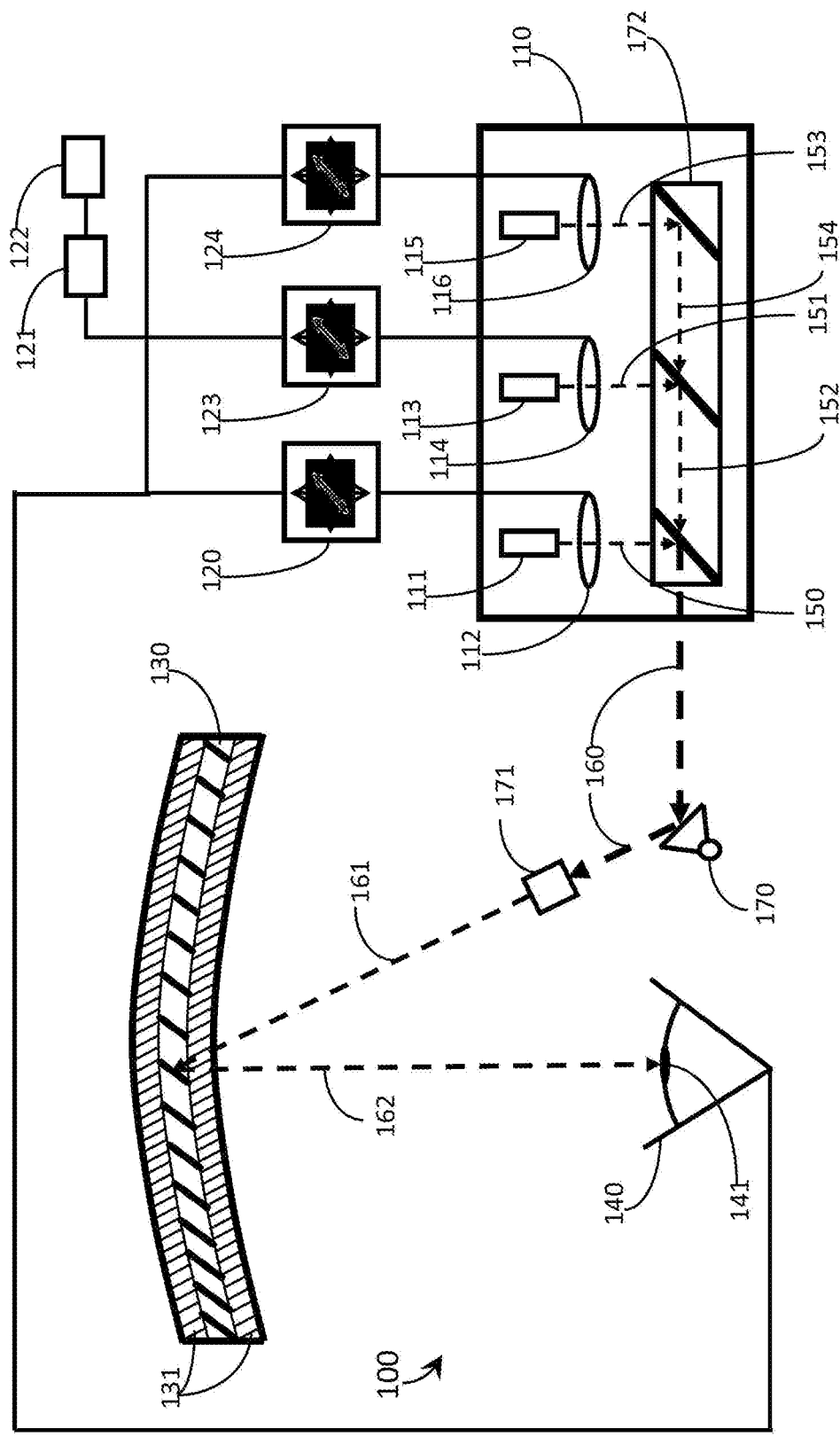
FIG. 1 is a schematic diagram of a lens alignment apparatus in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for aligning a lens in a laser projector and are particularly well-suited for use in wearable heads-up displays (WHUDS).

A laser projector may produce an image that is visible to a user by projecting a pattern of light onto a non-user object such as a screen, a wall, or similar surface. The image formed by the pattern of light may then be viewed by the user by the process of having the viewer look at the non-user object to view the image formed on the non-user object. In the alternative, a laser projector may produce an image that is visible to the user by projecting a pattern of light onto the retina of the eye of the user; in this case the projector forms part of a virtual retina display (VRD).

The projector light must pass through the pupil of the eye of the user in order to reach the retina of the eye of the user, which may be achieved with projector light that originates (or appears to originate) within the field of view (FOV) of the eye of the user. The projector light may be directed through the pupil of the eye of the user by mounting the projector itself within the FOV of the eye of the user, or by redirecting the projector light via an optical element within the FOV of the eye of the user. Said optical element may obstruct at least a portion of the FOV of the eye of the user, as in the case of Google Glass®. In the alternative, projector light may be directed through the pupil of the eye of the user via a transparent combiner where the transparent combiner redirects projector light into through the pupil of the eye of the user while allowing environmental light to pass through the transparent combiner and also be visible to the eye of the user. Typically, a transparent combiner includes a diffractive optical element (DOE). Non-exclusive examples of transparent combiners include holographic combiners and light guides.

A VRD employing a transparent combiner is advantageous as it allows the user to see the image produced by the projector without necessarily obstructing the field of view of the user, however the transparent combiner typically requires careful alignment of the projector in order for the projector to successfully direct light onto the retina of the eye of the user.

In a first example, a holographic transparent combiner is very sensitive to the angle at which projector light impinges on the holographic transparent combiner. Holographic transparent combiners are only able to redirect light that satisfies the Bragg condition for angle for at least one of the holograms within the holographic combiner; typical holographic transparent combiners have a very narrow range of angles that satisfy the Bragg condition. A small mis-alignment of the projector may cause a large change in the apparent position of the projected image and/or cause the holographic transparent combiner to be unable to redirect projector light into the eye of the user. The sensitivity of projector mis-alignment further increases for multi-laser projectors due to wavelength-dependent angular shifts in hologram playback causing the separate laser images to fail to overlap.

In a second example, a transparent combiner comprising a light guide is very sensitive to the angle at which projector light impinges on the light guide. A light guide based transparent combiner typically operates by incoupling projector light into the light guide with an incoupler, propagating the projector light through the light guide, and then outcoupling the light from the light guide into the eye of the user with an outcoupler. The incoupler and the outcoupler in a typical light guide comprise DOEs; throughout this specification and the appended claims, the terms "in-coupler" and "out-coupler" are generally used to refer to any type of optical grating structure, including without limitation: diffraction gratings, holograms, holographic optical elements (e.g., optical elements employing one or more holograms), volume diffraction gratings, volume holograms, surface relief diffraction gratings, and/or surface relief holograms.

Incoupling, propagation, and outcoupling of projector light are all strongly affected by the angle at which projector light impinges on the light guide; even a small mis-alignment of the projector may cause failure of incoupling, propagation, or outcoupling. The above-mentioned increase in sensitivity for multi-laser projectors is further increased in light guides due to the propagation of the laser light through the light guide.

A typical wearable heads-up display (WHUD) may comprise a support structure that (while in use) is worn on a head of a user, a transparent combiner carried by the support structure, and a projector carried by the support structure. Alignment of the projector in a WHUD may be defined as fixing the position of the projector at a distance and at an angle relative to the transparent combiner to direct projector light into the eye of the user; projector alignment may thereby be achieved by fixing the position and orientation of the projector relative to the transparent combiner. Typical manufacturing processes for producing the projector are inherently imprecise and assembly of the projector and the transparent combiner within the carrier without application of an additional alignment process to the projector will result in mis-alignment of the projector. There is a need in the art for a process to align a projector with a transparent combiner comprising a DOE to allow the projector to direct light into the eye of the user.

FIG. 1 is a schematic diagram of a lens alignment apparatus 100 in accordance with the present systems, devices, and methods. Lens alignment apparatus 100 comprises projector 110, first alignment adjuster 120, processor 121, non-transitory processor-readable medium 122, diffractive optical element 130 and light sensor 140. Projector 110 comprises first laser light source 111 and first lens 112. First alignment adjuster 120 is physically coupled to first lens 112 and first alignment adjuster 120 may be communicatively coupled to first lens 112. First alignment adjuster 120 and light sensor 140 are communicatively coupled to processor 121.

First lens 112 may comprise a refractive lens, a volume diffraction grating, a surface relief grating, a volume hologram, and/or a surface relief hologram. First lens 112 may comprise a spherical lens, a toric lens, and/or an aspheric lens.

First laser light source 111 produces a first laser light 150. First laser light 150 is directed by first laser light source 111 to first lens 112. First laser light is directed by first lens 112 to diffractive optical element (DOE) 130. DOE 130 may comprise at least one hologram. DOE 130 may comprise a light guide with an incoupler and an outcoupler; the incoupler may comprise a hologram; the incoupler may comprise a SRG, the outcoupler may comprise a hologram, and the outcoupler may comprise a SRG.

DOE 130 diffracts first laser light 150 to form diffracted light 162. Light sensor 140 measures at least one property of diffracted light 162. Light sensor 140 comprises sensing region 141. The at least one property of diffracted light 162 may be inside a specified range or outside a specified range. In response to the measured property of diffracted light 162 being outside the specified range, the position of first lens 112 is adjusted by first lens adjuster 120 to optimize a quality of diffracted light 162. First lens adjuster 120 may comprise a micromanipulator. First lens adjuster 120 may comprise at least one set screw. First lens adjuster 120 may comprise a sub-component of projector 110. First lens adjuster 120 may be controlled by processer 121, for example via an actuator. Processer 121 may be communicatively coupled to non-transitory processer-readable medium 122.

In response to the measured property of diffracted light 162 being inside the specified range, the position of first lens 112 is fixed at a current position. Fixing the position of first lens 112 includes physically coupling first lens 112 to at least a portion of projector 110. Physically coupling first lens 112 to at least a portion of projector 110 may comprise welding, adhering, or taping first lens 112 to at least a portion of projector 110. If first lens adjuster 120 comprises a sub-component of projector 110, first lens 112 may be fixed at a current position by disabling first lens adjuster 120, where disabling first lens adjuster 120 renders first lens adjuster 120 incapable of adjusting the position of first lens 112. First lens adjuster 120 may be disabled permanently (for example, adhering at least a portion of first lens adjuster 120 in place or breaking a portion of the adjuster, for instance breaking a head off a set screw) or temporarily (for example, physically decoupling a portion of first lens adjuster 120 from another component).

DOE 130 may comprise a hologram, in which case DOE 130 may apply a holographic optical function to diffracted light 162. The holographic optical function applied to diffracted light 162 may include converging the diffracted light, diverging the diffracted light, and collimating the diffracted light. More than one holographic optical function may be applied to diffracted light 162. For example, a first holographic optical function may be applied to diffracted light 162 along a first axis and a second holographic optical function may be applied along a second axis to correct for (or in the alternative: to induce) astigmatism in diffracted light 162.

Figure 2:
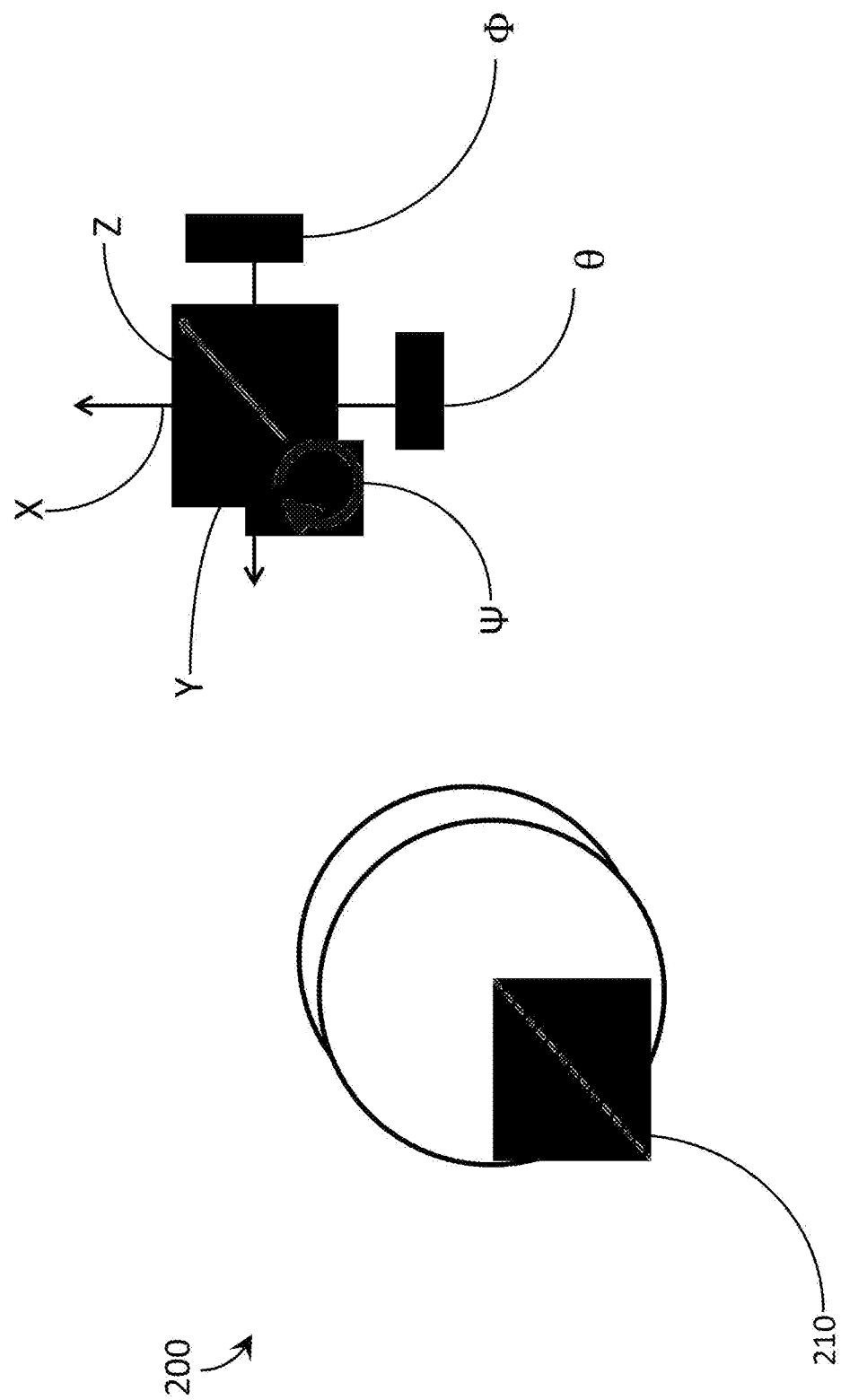
FIG. 2 is an example of a lens possessing a principal axis and the dimensions through which the lens may be translated or rotated in accordance with the present systems, devices, and methods.

FIG. 2 is an example of a lens 200 possessing a principal axis 210 and the dimensions through which lens 200 may be translated or rotated. Throughout this specification and the appended claims, the term "principal axis" generally refers to the line passing through the optical center and optical centers of curvature of the faces of a lens. FIG. 2 depicts first dimension X, second dimension Y, and third dimension Z. Second dimension Y is perpendicular to first dimension X. Third dimension Z is perpendicular first dimension X and second dimension Y. FIG. 2 depicts first axis of rotation θ, second axis of rotation ϕ and third axis of rotation ψ. First axis of rotation θ is aligned along first dimension X. Second axis of rotation ϕ is aligned along second dimension Y, therefore second axis of rotation ϕ is perpendicular to first axis of rotation θ. Third axis of rotation ψ is aligned along third dimension Z, therefore third axis of rotation ψ is perpendicular to first axis of rotation θ and second axis of rotation ϕ.

The position of lens 200 may be adjusted, where adjusting the position of lens 200 may be performed as part of a process to align a projector. The position of lens 200 may be adjusted via lateral displacement of lens 200 in at least one of: first dimension X, second dimension Y, and third dimension Z. Lateral displacement of lens 200 in a dimension includes linear movement in said dimension. The position of lens 200 may be adjusted via angular displacement of lens 200 around at least one of: first axis of rotation θ, second axis of rotation ϕ, and third axis of rotation ψ. Angular displacement of lens 200 around an axis includes rotation of lens 200 around said axis.

FIG. 2 is a front elevational view of a lens 200 in accordance with the present systems, devices, and methods. FIG. 2 depicts lens 200 in an orientation where principal axis 210 is aligned with third dimension Z. A person of skill in the art will appreciate that the alignment of three perpendicular dimensions (and associated axes of rotation) is an arbitrary frame of reference, and lens 200 could be depicted with principal axis 210 oriented in any direction. Throughout this specification and the appended claims, lenses are depicted with their principal axes initially aligned with the Z axis for the sake of clarity when discussing angular and/or lateral displacement. With the aforementioned orientation, a spherical lens is symmetrical around the Z axis and therefore rotation around third axis of rotation ψ will not cause any observable change in light passing through lens 200 along the Z axis; in contrast rotation of lens around first axis of rotation θ and/or second axis of rotation ϕ will cause a change in the optical path of light that was initially passing through lens 200 along the Z axis. If lens 200 is not spherical (e.g., if lens 200 has a cylindrical optical power) then rotation around third axis of rotation ψ may be referred to as "clocking" lens 200.

Returning to FIG. 1, adjusting the position of first lens 112 may be substantively similar to adjusting the position of lens 200. Adjusting the position of first lens 112 to optimize a quality of diffracted light 162 may include adjusting the position of first lens 112 to maximize a brightness of the diffracted light. Adjusting the position of first lens 112 to optimize a quality of diffracted light 162 may include adjusting the position of first lens 112 to minimize a variation of a brightness of the diffracted light across sensing region 141. Adjusting the position of first lens 112 to optimize a quality of diffracted light 162 may include adjusting the position of first lens 112 to maintain a brightness of the diffracted light within a brightness range, the brightness range delimited by a nominal minimum brightness and a nominal maximum brightness. The brightness may be measured on an absolute scale, e.g., a minimum power (for example, a minimum value of watts per square meter). The brightness may be measured on an arbitrary scale, for example a minimum value on a scale from 1 to 255. The brightness may be measured on an relative scale, for example a scale where the minimum brightness is the lowest brightness that may be measured by the light sensor and where the maximum brightness is the maximum brightness that may be measured by the light sensor.

Lens alignment apparatus 100 may comprise dynamic mirror 170. Dynamic mirror 170 may comprise a microelectromechanical system (MEMS) mirror. Dynamic mirror 170 may comprise a dynamic light processing (DLP) mirror. First lens 112 may direct first laser light 150 to dynamic mirror 170, and dynamic mirror 170 may direct first laser light 150 to DOE 130. Dynamic mirror 170 may comprise a mirror that may rotate around at least one axis, where rotating dynamic mirror 170 around at least one axis allows the path of first laser light 150 (and consequently the final position of first laser light 150) to be altered and/or controlled. If dynamic mirror is capable of rotating around one axis, dynamic mirror 170 may be swept through a first range of angles, causing laser light 170 to be swept across a one-dimensional line impinging on DOE 130 and across one-dimensional line impinging on light sensor 140. If the one-dimensional line swept by laser light 150 is at least partially encompassed by sensing region 141 then the quality of first laser light 150 across the one-dimensional line swept by laser light 150 may be measured by light sensor 140.

Figure 6:
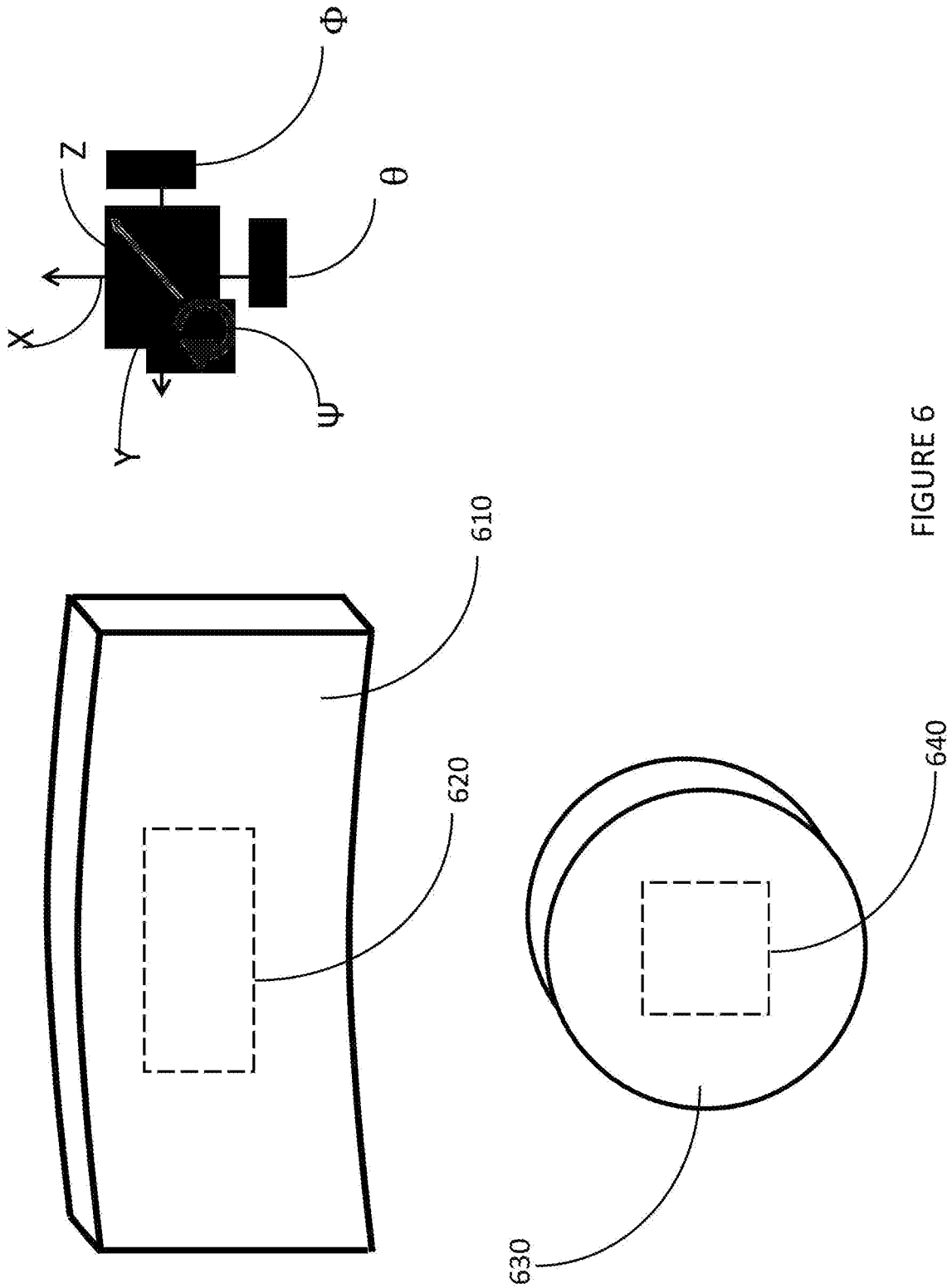
FIG. 6 is a front elevational view of a diffractive optical element ("DOE") and a light sensor in accordance with the present systems, devices, and methods.

FIG. 6 is a front elevational view of a DOE 610 and a light sensor 630 in accordance with the present systems, devices, and methods. DOE 610 may be substantively similar to DOE 130. Light sensor 630 may be substantively similar to light sensor 140. DOE 610 comprises two-dimensional area of the DOE 620. Light sensor 630 comprises two-dimensional area of the light sensor 640.

Returning to FIG. 1, if dynamic mirror 170 is capable of rotating around two axes, dynamic mirror 170 may swept across a range of angles in two dimensions, causing first laser light 150 to be swept across a two-dimensional area of DOE 130. DOE 130 may diffract first laser light across the two-dimensional area of DOE 130. DOE 130 may direct laser light 150 across a two-dimensional area of light sensor 140. Light sensor 140 may measure a property of first laser light 150 across a two-dimensional area of light sensor 140. A two-dimensional image may be formed by first laser light 150 by varying the intensity of first laser light 150 as first laser light 150 is swept across the two-dimensional area of light sensor 140. The two-dimensional area of light sensor 140 may comprise a set of pixels, where each pixel comprises a portion of the two-dimensional area of light sensor 140. An image may be formed by individually illuminating individual pixels with laser light 150 by varying the intensity of first laser light 150 as first laser light 150 is swept across the two-dimensional area of light sensor 140.

Light sensor 140 may comprise sensing region 141. If the two-dimensional area swept by laser light 150 is at least partially encompassed by sensing region 141 then the quality of first laser light 150 across the two-dimensional area swept by laser light 150 may be measured by light sensor 140.

A person of skill in the art will appreciate that a first dynamic mirror capable of rotating around one axis combined with a second dynamic mirror capable of rotating around one axis in series, where the second dynamic mirror is positioned and oriented such that the second mirror's axis of rotation is perpendicular to the first mirror's axis of rotation, may sweep first laser light 150 across a two-dimensional area of light sensor 140 in a manner substantively similar to a dynamic mirror capable of rotating around two axes as described above.

Sweeping first laser light 150 across a two-dimensional area of light sensor 140 may be achieved by scanning a raster across light sensor 140. Scanning a raster across a two dimensional area with a beam of laser light is typically achieved by scanning the beam of laser light in a first dimension across the entire length of the first dimension of the two dimensional area, moving the beam of laser light a short distance in the second dimension, scanning the beam of laser light in the first dimension across the entire length of the first dimension of the two dimensional area, moving the beam of laser light a short distance in the second dimension, and repeating this process until the entire two-dimensional area has been scanned. Scanning a raster may be achieved with a dynamic mirror 170 comprising a two-dimensional micro-electromechanical system (MEMS) mirror, where first axis of rotation is driven via resonance (the "fast" scan direction), and the second axis of rotation is driven directly (the "slow" scan direction). Scanning a raster is advantageous because a raster scan produces an image with more consistent resolution across the two-dimensional area.

In the alternative, sweeping first laser light 150 across a two-dimensional area of light sensor 140 may be achieved by sweeping a Lissajous curve across the two-dimensional area. A Lissajous curve comprises reciprocating motion in a first dimension with a first frequency with simultaneous reciprocating motion in a second dimension with a second frequency, where the first frequency is not equal to the second frequency. Sweeping a Lissajous curve across the two-dimensional area may be achieved with a dynamic mirror 170 comprising a two-dimensional MEMS mirror where the first axis of rotation is driven via resonance with a first resonant frequency, the second axis of rotation is driven via resonance with a second resonant frequency, and the first resonant frequency is not equal to the second resonant frequency. Sweeping a Lissajous is advantageous as it allows the use of resonant-driven rotation in two axes, which allows the MEMS mirror to be fabricated with smaller dimensions.

Lens alignment apparatus 100 may comprise splitter 171. Splitter 171 may be substantively similar to the splitter described in U.S. Non-Provisional patent application Ser. No. 15/046,254. Dynamic mirror 170 may scan a raster or a Lissajous curve across at least one facet of splitter 171 with first laser light 150, splitting laser light 150 into at least one portion of laser light where each portion of laser light is scanned across a respective facet of splitter 171. Each facet of splitter 171 corresponds to a respective virtual position of projector 110. Each virtual position of projector 110 may correspond to a respective exit pupil of first laser light 150. Splitter 171 may direct first laser light 150 to DOE 130, where each portion of laser light 150 forms a corresponding portion of diffracted light 162. Light sensor 140 may measure at least one property of each portion of diffracted light 162. In response to the measured property of each portion of diffracted light 162 being outside the specified range, the position of first lens 112 may be adjusted by first lens adjuster 120 to optimize a quality of each portion of diffracted light 162.

Projector 110 may comprise second laser light source 113, second lens 114, and second alignment adjuster 123. Second alignment adjuster 123 is physically coupled to second lens 114 and second alignment adjuster 123 may be communicatively coupled to second lens 114. Second alignment adjuster 123 is communicatively coupled to processor 121. Second lens 114 may be substantively similar to first lens 112. Second laser light source 113 may be substantively similar to first laser light source 111. Second alignment adjuster 123 may be substantively similar to first alignment adjuster 120.

Second laser light source 113 produces second laser light 151. Second laser light 151 may be substantively similar to first laser light 150. First laser light 150 and second laser light 151 may possess at least approximately the same wavelength, phase, polarization, beam size, and/or brightness. Advantageously, second laser light 151 may be of a different wavelength than first laser light 150.

Projector 110 may comprise third laser light source 115, third lens 116, and third alignment adjuster 124. Third alignment adjuster 124 is physically coupled to third lens 116 and third alignment adjuster 124 may be communicatively coupled to third lens 116. Third alignment adjuster 123 is communicatively coupled to processor 121. Third lens 116 may be substantively similar to first lens 112. Third laser light source 115 may be substantively similar to first laser light source 111. Third alignment adjuster 124 may be substantively similar to first alignment adjuster 120.

Third laser light source 115 produces third laser light 153. Third laser light 153 may be substantively similar to first laser light 150 and second laser light 151. First laser light 150, second laser light 151, and third laser light 153 may possess at least approximately the same wavelength, phase, polarization, beam size, and/or brightness. Advantageously, third laser light 153 may be of a different wavelength than first laser light 150 and second laser light 151. Advantageously, first laser light 150 may comprise red light, second laser light 151 may comprise green light, and third laser light 153 may comprise blue light, to allow projector 110 to produce full-color images.

DOE 130 may comprise a wavelength-multiplexed hologram, where the wavelength-multiplexed hologram comprises at least two wavelength-specific holograms. Each wavelength-specific hologram may diffract light of a particular wavelength. Advantageously, each wavelength-specific hologram may diffract light of a wavelength corresponding to each of first laser light 150, second laser light 151, and third laser light 153.

Projector 110 may comprise beam combiner 172. Beam combiner 172 combines at least two beams of laser light to produce a single combined beam of laser light. Beam combiner 172 may combine at least two beams of laser light by selectively reflecting and/or transmitting laser light. Beam combiner 172 may comprise material that is birefringent; beam combiner 172 may comprise material with a wavelength-dependent refractive index.

One implementation of beam combiner 172 is depicted in FIG. 1 which employs angle-dependent transmission and reflection of laser light. Third laser light 153 enters beam combiner 172 and encounters a third surface of beam combiner 172 comprising a third surface angle and a third refractive index. The combination of the incident angle of third laser light 153, the third surface angle and third refractive index, causes third laser light 153 to experience total internal reflection within beam combiner 172; as a result, third laser light 153 reflects off of the third surface of beam combiner 172 to form reflected light 154. Reflected light 154 encounters a second surface of beam combiner 172 comprising a second surface angle and a second refractive index. The combination of the incident angle of reflected light 154, the second surface angle and second refractive index causes reflected light 154 to pass through the second surface of beam combiner 172.

Second laser light 151 enters beam combiner 172 and encounters the second surface of beam combiner 172. The combination of the incident angle of second laser light 151, the second surface angle and second refractive index, causes second laser light 151 to experience total internal reflection within beam combiner 172; as a result, second laser light 150 reflects off of the second surface of beam combiner 172 with the same position and angle as reflected light 154, forming sub-combined light 152. Sub-combined light 152 encounters a first surface of beam combiner 172 comprising a first surface angle and a first refractive index. The combination of the incident angle of sub-combined light 152, the first surface angle and first refractive index causes sub-combined light 152 to pass through the first surface of beam combiner 172.

First laser light 150 enters beam combiner 172 and encounters the first surface of beam combiner 172. The combination of the incident angle of first laser light 150, the first surface angle, and first refractive index, causes first laser light 150 to experience total internal reflection within beam combiner 172; as a result, first laser light 150 reflects off of the first surface of beam combiner 172 with the same position and angle as sub-combined light 152, forming combined light 160. In other words, combined light 160 comprises first laser light 150, second laser light 151, and third laser light 153. While beam combiner 172 has been described above combining light from three laser light sources into combined light 160, a person of skill in the art will appreciate that a beam combiner similar in some ways to beam combiner 172 may be employed to combine light from 2, 4, or more light sources into a single beam of light.

Combined light 160 may be diffracted by DOE 130 to form diffracted light 162 in a manner substantively similar to first laser light 150. In other words, diffracted light 162 may comprise more than one portion of light, where each portion of light originates from a respective laser light source. Combined light 160 may be redirected by dynamic mirror 170 in a manner substantively similar to first laser light 150. Dynamic mirror 170 may scan a raster or a Lissajous curve with combined light 160 in a manner substantively similar to first laser light 150. Light sensor 140 may measure at least one property of each portion of laser light comprising diffracted light 162. Light sensor 140 may measure the overlap between each portion of light comprising diffracted light 162 and each other portion of light comprising diffracted light 162. The overlap between each portion of light comprising diffracted light 162 and each other portion of light comprising diffracted light 162 may comprise one of the at least one property of diffracted light 162 measured by light sensor 140.

In response to the measured property of diffracted light 162 being outside the specified range, the position of second lens 114 may be adjusted by second lens adjuster 123 to optimize a quality of diffracted light 162. Second lens 114 may be substantively similar to first lens 111. Second lens adjuster 123 may be substantively similar to first lens adjuster 120.

In response to the measured property of diffracted light 162 being outside the specified range, the position of third lens 116 may be adjusted by third lens adjuster 124 to optimize a quality of diffracted light 162. third lens 116 may be substantively similar to first lens 111. Third lens adjuster 124 may be substantively similar to first lens adjuster 120. While lens alignment apparatus 100 is depicted in FIG. 1 comprising three sets of laser light sources, lenses, and lens adjusters, a person of skill in the art will appreciate that lens alignment apparatus 100 may comprise 2, 4, or more sets of laser light sources, lenses, and lens adjusters.

DOE 130 may comprise outer layer 131. Outer layer 131 may comprise an eyeglass lens. Outer layer 131 may comprise a prescription eyeglass lens. Outer layer 131 may comprise a protective layer to prevent damage to DOE 130 by harsh environmental conditions; said harsh environmental conditions may include high temperature and/or chemical exposure during or after subsequent processes applied to DOE 130.

Figure 7:
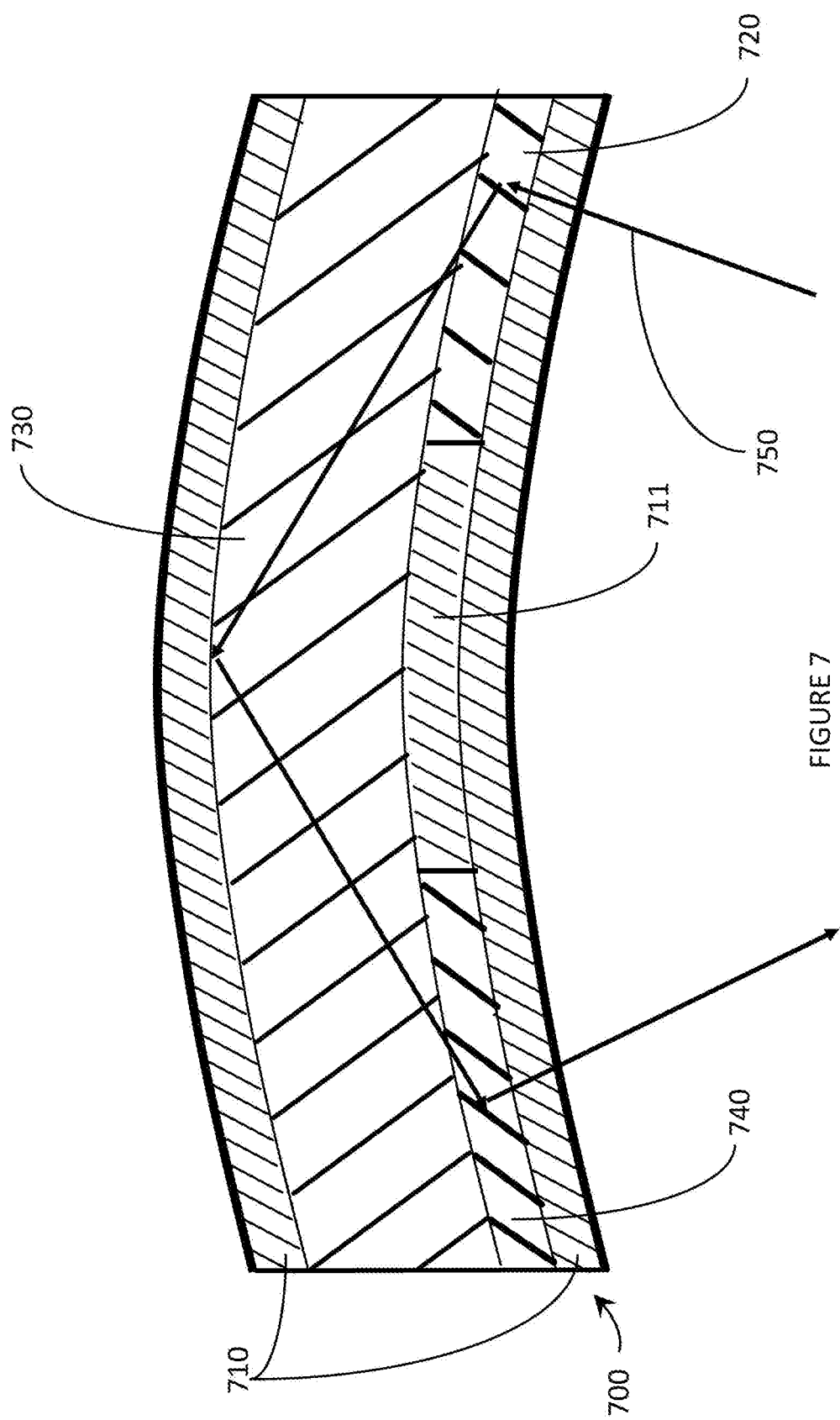
FIG. 7 is a cross-sectional view of a DOE in accordance with the present systems, devices, and methods.

FIG. 7 is a cross-sectional view of DOE 700 in accordance with the present systems, devices, and methods. DOE 700 comprises a light guide. DOE 700 comprises light guide 730, outcoupler 740, and incoupler 750.

Outcoupler 740 directs light out of light guide 730; outcoupler 740 may direct light towards a light sensor. Outcoupler 740 may comprise a DOE. Incoupler 750 directs light into light guide 730. Outcoupler 740 is depicted in FIG. 7 in a transmission-type geometry, however a person of skill in the art will appreciate that outcoupler 740 may also be located within DOE 700 in a reflection-type geometry by moving outcoupler 740 to the opposite side of light guide 730.

Incoupler 750 may comprise a DOE. Light guide 730 directs light from incoupler 750 to outcoupler 740; light guide 730 may guide light via total internal reflection. Incoupler 750 is depicted in FIG. 7 in a transmission-type geometry, however a person of skill in the art will appreciate that incoupler 750 may also be located within DOE 700 in a reflection-type geometry by moving incoupler 750 to the opposite side of light guide 730.

DOE 700 may comprise spacer 711; spacer 711 separates incoupler 750 from outcoupler 740. DOE 130 may comprise protective layer 710; protective layer 710 may be substantively similar to outer layer 131.

Returning to FIG. 1, DOE 130 may comprise a light guide substantively similar to DOE 700.

Figure 3:
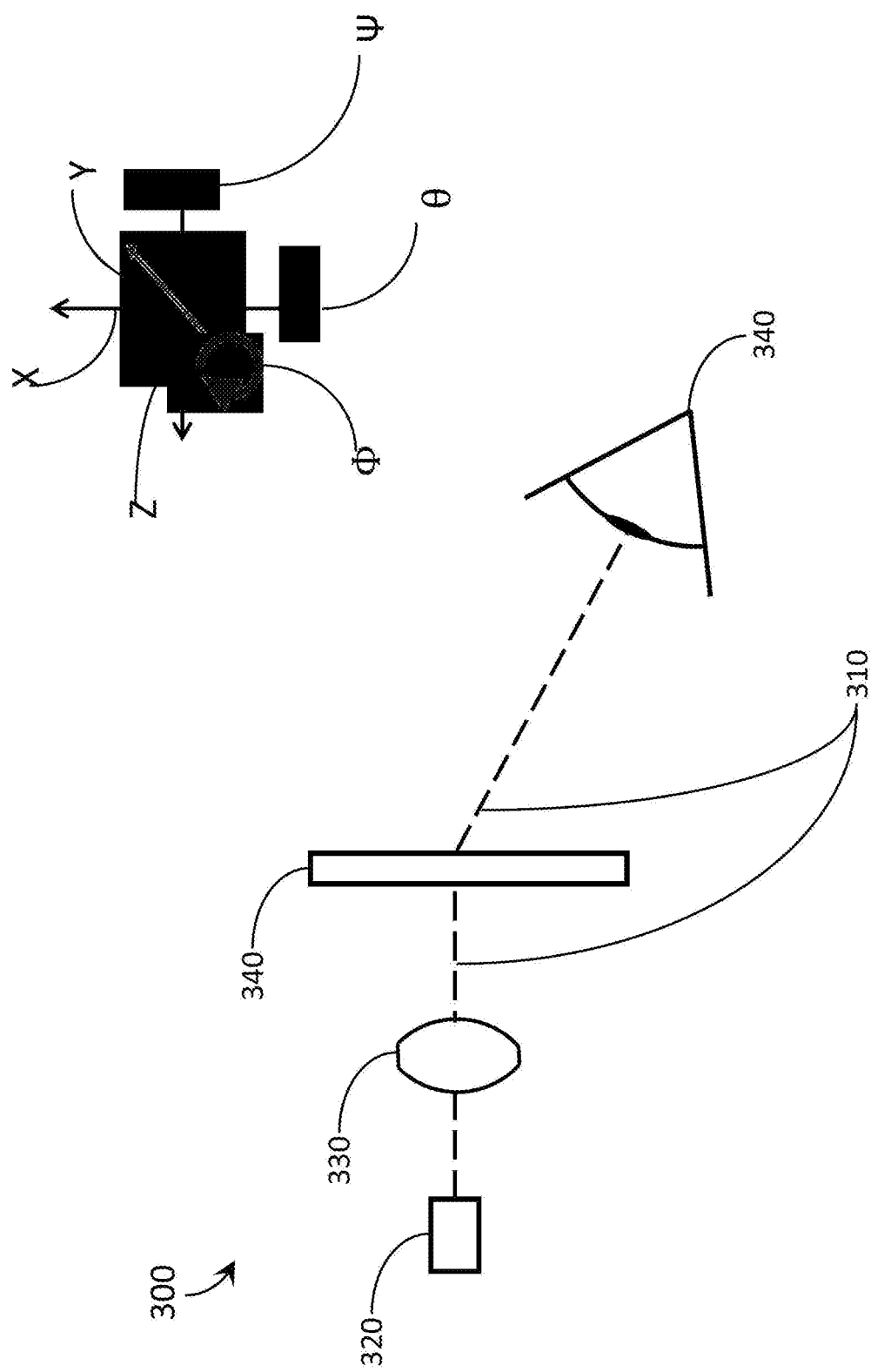
FIG. 3 is a side-elevational view of optical path in accordance with the present systems, devices, and methods.

FIG. 3 is a side-elevational view of optical path 300 in accordance with the present systems, devices, and methods. Optical path 300 may be substantively similar to the optical path of lens alignment apparatus 100 depicted in FIG. 1. Optical path 300 includes laser light source 320, lens 330, DOE 340, and light sensor 350. Laser light source 320 emits laser light 310. Laser light 310 is directed along optical path 300. Optical path 300 extends between laser light source 320 and light sensor 350, and passes through lens 330 and DOE 340. Laser light source 320 may be substantively similar to first laser light source 111. Light sensor 350 may be substantively similar to light sensor 140. lens 320 may be substantively similar to first lens 112. DOE 340 may be substantively similar to DOE 130.

Lens 330 may is selectively positionable along optical path 300. In other words, the position of lens 330 may be selectively changed in at least one of: lateral displacement of the lens in a first dimension X, lateral displacement of the lens in a second dimension Y perpendicular to the first dimension X, lateral displacement of the lens in a third dimension Z perpendicular to the first dimension X and perpendicular to the second dimension Y, angular displacement of the lens around a first axis θ wherein the first axis θ is aligned along the first dimension X, angular displacement of the lens around a second axis φ wherein the second axis ϕ is aligned along the second dimension Y perpendicular to the first dimension X, and angular displacement around of the lens around a third axis ψ wherein the third axis ψ is aligned along the third dimension X perpendicular to the first dimension X and perpendicular to the second dimension Y.

A person of skill in the art will appreciate that the illustrated order of the various elements in the optical path described in FIG. 1 (projector 110, first alignment adjuster 120, processor 121, non-transitory processor-readable medium 122, diffractive optical element 130, light sensor 140, dynamic mirror 170, splitter 171) is shown for exemplary purposes only and may change in alternative embodiments.

Figure 4:
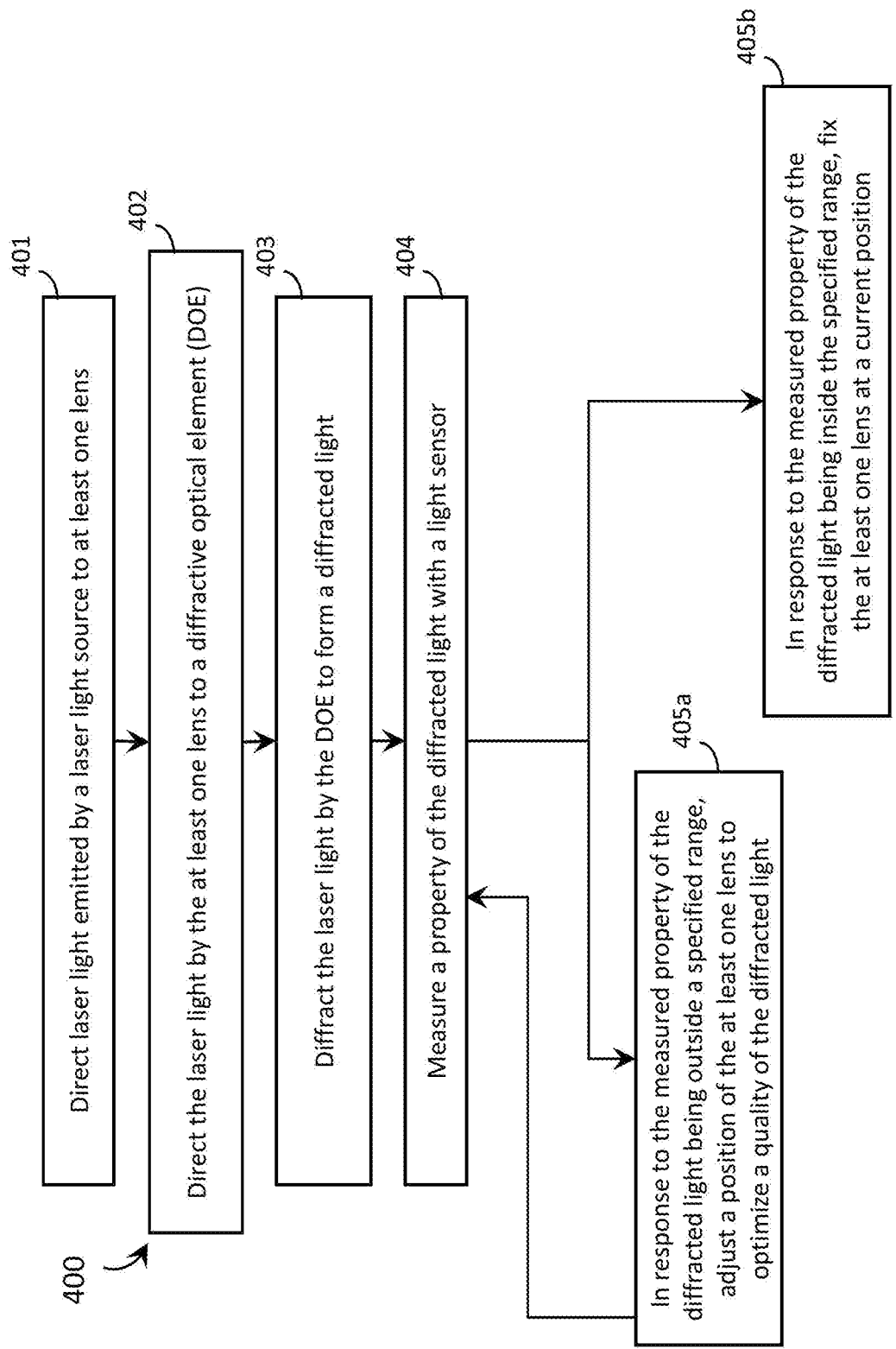
FIG. 4 is a flow-diagram showing a method to perform alignment in a projector in accordance with the present systems, devices, and methods.

FIG. 4 is a flow-diagram showing a method 400 to perform alignment in a projector in accordance with the present systems, devices, and methods. Method 400 includes six acts 401, 402, 403, 404, 405a, and 405b, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

As an illustrative example of the physical elements of method 400, analogous structures from FIG. 1, FIG. 2, FIG. 6, and FIG. 7 are called out in parentheses throughout the description of acts 401, 402, and 403, 404, 405a, and 405b.

At 401, laser light (150, 151, 153) emitted by a laser light source (111, 113, 115) is directed to at least one lens (112, 114, 116).

At 402, the laser light (150, 151, 153) is directed by the at least one lens (112, 114, 116) to a diffractive optical element (DOE) (130). Directing the laser light (150, 151, 153) by the at least one lens (112, 114, 116) to the DOE (130) may include directing the laser light (150, 151, 153) by the at least one lens (112, 114, 116) to a beam combiner (172) and directing the laser light (150, 151, 153) by the beam combiner (172) to the DOE (130).

At 403, the laser light (150, 151, 153) is diffracted by the DOE (130) to form a diffracted light (162). Diffracting the laser light (150, 151, 153) by the DOE (130) to form a diffracted light (162) includes applying a holographic optical function to the diffracted light (162). Applying a holographic optical function to the diffracted light (162) may include applying an optical function chosen from a group comprising one or more of: converging the diffracted light (162), diverging the diffracted light (162), and collimating the diffracted light (162).

Diffracting the laser light (150, 151, 153) by the DOE (130) to form a diffracted light (162) may include at least one of: directing the diffracted light (162) into a light guide (730), and directing the diffracted light (162) out of the light guide (730).

At 404, a property of the diffracted light (162) is measured with a light sensor (140). Measuring a property of the diffracted light (162) with the light sensor (140) may include measuring a property of the diffracted light (162) to which the holographic optical function has been applied.

At 405a, in response to the measured property of the diffracted light (162) being outside a specified range, the position of the at least one lens (112, 114, 116) is adjusted to optimize a quality of the diffracted light (162). Adjusting a position of the at least one lens (112, 114, 116) to optimize a quality of the diffracted light (162) may include adjusting at least one of: the position of the at least one lens (112, 114, 116) in a first dimension (X), the position of the at least one lens (112, 114, 116) in a second dimension (Y) perpendicular to the first dimension, the position of the at least one lens (112, 114, 116) in a third dimension (Z) perpendicular to the first dimension and perpendicular to the second dimension, the angle θ of the lens measured relative to a first axis, and the angle ϕ of the at least one lens (112, 114, 116) measured relative to a second axis perpendicular to the first axis, and the angle LP of the at least one lens (112, 114, 116) measured relative to a third axis perpendicular to the first axis and perpendicular to the second axis.

Adjusting a position of the at least one lens (112, 114, 116) to optimize a quality of the diffracted light (162) may include adjusting the position of the at least one lens (112, 114, 116) to maximize a brightness of the diffracted light (162). Adjusting a position of the at least one lens (112, 114, 116) to optimize a quality of the diffracted light (162) may include adjusting the position of the at least one lens (112, 114, 116) to minimize a variation of a brightness of the diffracted light (162) across a region of the sensor. Adjusting a position of the at least one lens (112, 114, 116) to optimize a quality of the diffracted light (162) may include adjusting the position of the at least one lens (112, 114, 116) to maintain a brightness of the diffracted light (162) within a brightness range, the brightness range comprising delimited by a nominal minimum brightness and a nominal maximum brightness At 405b, in response to the measured property of the diffracted light (162) being inside a specified range, the position of the at least one lens (112, 114, 116) is fixed at a current position.

Directing the light from the at least one lens (112, 114, 116) to a DOE (130) may include directing the laser light (150, 151, 153) from the at least one lens (112, 114, 116) to a dynamic mirror (170) and directing the laser light (150, 151, 153) from the dynamic mirror (170) to the DOE (130). Directing the laser light (150, 151, 153) from the dynamic mirror (170) to the DOE (130) may include directing the laser light (150, 151, 153) from the dynamic mirror (170) to a splitter (171) and directing the laser light (150, 151, 153) from the splitter (171) to the DOE (130). Directing the laser light (150, 151, 153) from the splitter (171) to the DOE (130) may include splitting the laser light (150, 151, 153) into at least two portions of light; each portion of light may comprise an exit pupil. Measuring a property of the diffracted light (162) may include measuring a property of the at least two portions of light. Adjusting a position of the at least one lens (112, 114, 116) to optimize a quality of the diffracted light (162) may include adjusting a position of the at least one lens (112, 114, 116) to optimize the quality of the at least two portions of light.

Directing the laser light (150, 151, 153) by the dynamic mirror (170) to the DOE (130) may include sweeping across a two-dimensional area of the DOE (620) with the laser light (150, 151, 153). Diffracting the laser light (150, 151, 153) by the DOE (130) to form a diffracted light (162) may include diffracting the laser light (150, 151, 153) by the two-dimensional area of the DOE (620) to form a diffracted light (162). Measuring a property of the diffracted light (162) with a light sensor (140) may include measuring a property of the diffracted light (162) across a two-dimensional area of the light sensor (640).

Directing the laser light (150, 151, 153) by the dynamic mirror (170) to the DOE (130) may include sweeping across a two-dimensional area of the DOE (620) with the laser light (150, 151, 153). Diffracting the laser light (150, 151, 153) by the DOE (130) to form a diffracted light (162) may include diffracting the laser light (150, 151, 153) by the two-dimensional area of the DOE (620) to form a diffracted light (162). Measuring a property of the diffracted light (162) with a light sensor (140) may include measuring a property of the diffracted light (162) across a two-dimensional area of the light sensor (640). The two-dimensional area of the light sensor (640) may comprise at least one set of pixels, and each of the at least one sets of pixels has a respective pixel resolution. Adjusting a position of the at least one lens (112, 114, 116) to optimize a quality of the diffracted light (162) may include adjusting the position of the at least one lens (112, 114, 116) to maximize each pixel resolution of the at least one set of pixels.

Sweeping across a two-dimensional area of the DOE (620) with laser light may include scanning a raster across the DOE (130). Measuring a property of the diffracted light (162) with a light sensor (140) may include measuring a property of the diffracted light (162) scanned across the two-dimensional area of the light sensor (640) as a raster. Sweeping across a two-dimensional area of the DOE (620) with laser light may include sweeping a Lissajous curve across the DOE (130). Measuring a property of the diffracted light (162) with a light sensor (140) may include measuring a property of the diffracted light (162) swept across the two-dimensional area of the light sensor (640) as a Lissajous curve.

Directing laser light (150, 151, 153) emitted by the at least one laser light source (111, 113, 115) to the at least one lens (112, 114, 116) may include directing an initial laser light (151) emitted by an initial laser light source (111) to an initial lens (112) and directing at least one additional laser light (151, 153) emitted by at least one additional laser light source (113, 115) to at least one additional lens (114, 116). Directing the laser light (150, 151, 153) from the at least one lens (112, 114, 116) to a DOE (130) may include directing the initial laser light (151) from the initial lens (112) to the DOE (130) and directing the at least one additional laser light (151, 153) from the at least one additional lens to the DOE (130). Diffracting the laser light (150, 151, 153) by the DOE (130) to form a diffracted light (162) may include diffracting the initial laser light (151) by the DOE (130) to form an initial diffracted light (162) and diffracting the at least one additional laser light (151, 153) by the DOE (130) to form at least one additional diffracted light (162). Measuring a property of the diffracted light (162) with the light sensor (140) may include measuring a property of the initial diffracted light (162) with the light sensor (140) and measuring a property of the at least one additional diffracted light (162) with the light sensor (140). Adjusting a position of the at least one lens (112, 114, 116) to optimize a quality of the diffracted light (162) may include adjusting the position of the initial lens (112) to optimize the quality of the initial laser light (151) and adjusting the position of the at least one additional lens to optimize the quality of the at least one additional laser light (151, 153). Fixing the position of the at least one lens (112, 114, 116) may include fixing the position of the initial lens (112) and fixing the position of the at least one additional lens.

Adjusting a position of the at least one lens (112, 114, 116) to optimize a quality of the diffracted light (162) may include adjusting the position of the at least one additional lens to maximize an overlap between the initial laser light (151) and the at least one additional laser light (151, 153). The initial laser light (151) may comprise light of an initial wavelength, each of the at least one additional laser light (151, 153) may comprise light with a respective additional wavelength, and the at least one DOE (130) may comprise a wavelength-multiplexed hologram. Diffracting the laser light (150, 151, 153) by the DOE (130) to form a diffracted light (162) may include diffracting the initial laser light (151) by the wavelength-multiplexed hologram to form an initial diffracted light (162) and diffracting the at least one additional laser light (151, 153) by the wavelength-multiplexed hologram to form at least one additional diffracted light (162).

Method 400 may further comprise directing the diffracted light (162) from the DOE (130) to the light sensor (140).

Figure 5:
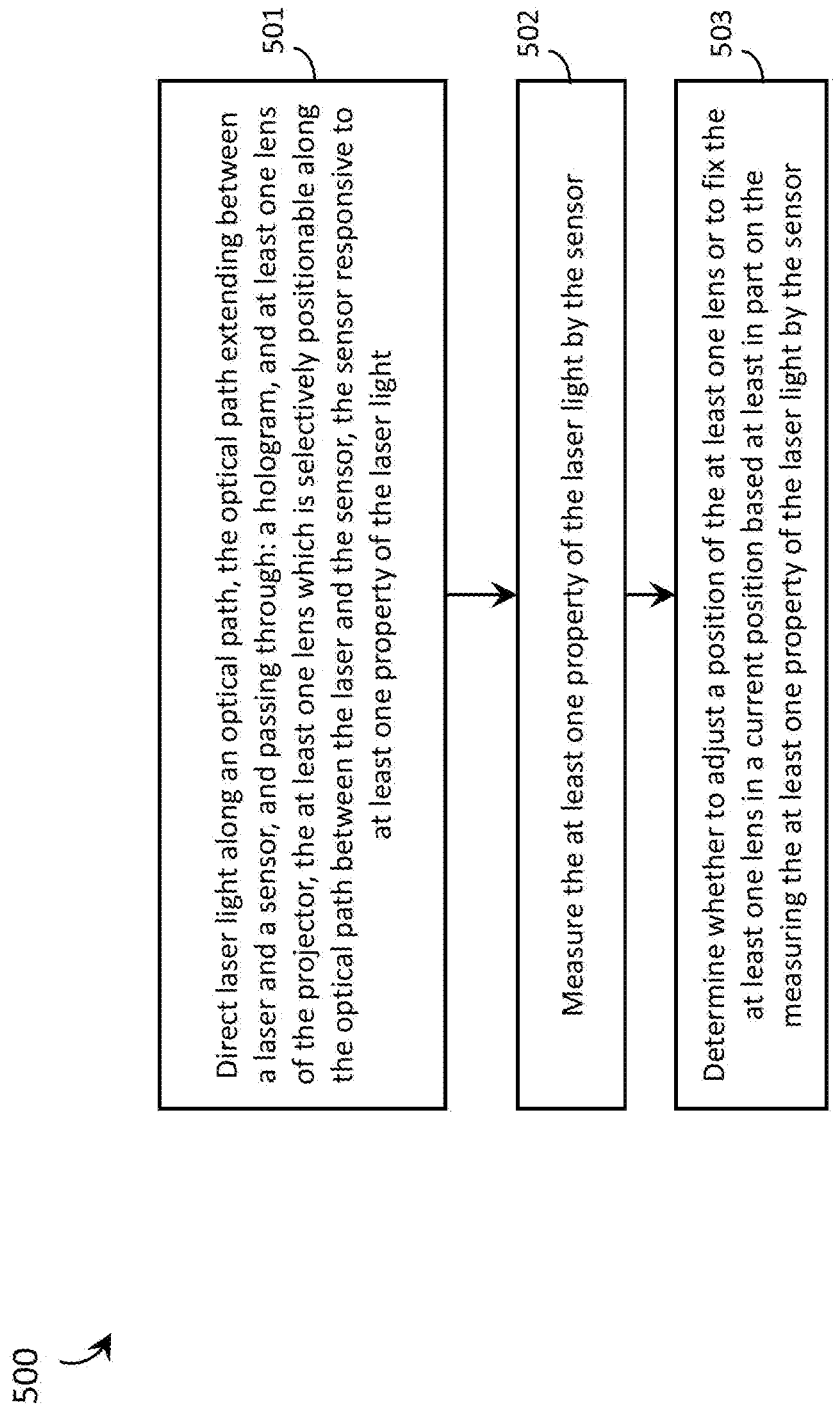
FIG. 5 is a flow-diagram showing a method to perform alignment in a projector in accordance with the present systems, devices, and methods.

FIG. 5 is a flow-diagram showing a method 500 to perform alignment in a projector in accordance with the present systems, devices, and methods. Method 500 includes three acts 501, 502, and 503, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

As an illustrative example of the physical elements of method 500, analogous structures from FIG. 1, FIG. 2, FIG. 6, and FIG. 7 are called out in parentheses throughout the description of acts 501, 502, and 503.

At 501, laser light (150, 151, 153) is directed along an optical path, the optical path extending between a laser (111, 113, 115) and a sensor (140), and passing through: a diffractive optical element ("DOE") (130); and at least one lens (112, 114, 116) of the projector (110), the at least one lens (112, 114, 116) which is selectively positionable along the optical path between the laser (111, 113, 115) and the sensor (140), the sensor (140) responsive to at least one property of the laser light (150, 151, 153).

At 502, at least one property of the laser light (150, 151, 153) is measured by the sensor (140).

At 503, whether to adjust a position of the at least one lens (112, 114, 116) or to fix the at least one lens (112, 114, 116) in a current position is determined based at least one part on the measurement of the at least one property of the laser light (150, 151, 153) by the sensor (140).

Determining whether to adjust a position of the at least one lens (112, 114, 116) or to fix the at least one lens (112, 114, 116) in a current position based at least one part on the measurement of the at least one property of the laser light (150, 151, 153) by the sensor (140) may comprise: determining whether the at least one property of the laser light (150, 151, 153) measured by the sensor (140) is within a specified range; and adjusting the current position of the at least one lens (112, 114, 116) in response to a determination that the at least one property of the laser light (150, 151, 153) measured by the sensor (140) is out of the specified range.

Determining whether to adjust a position of the at least one lens (112, 114, 116) or to fix the at least one lens (112, 114, 116) in a current position based at least one part on the measurement of the at least one property of the laser light (150, 151, 153) by the sensor (140) may further comprise: fixing the at least one lens (112, 114, 116) in the current position of the at least one lens (112, 114, 116) in response to a determination that the at least one property of the laser light (150, 151, 153) measured by the sensor (140) is in the specified range.

Adjusting the current position of the at least one lens (112, 114, 116) may include adjusting the at least one lens (112, 114, 116) in a manner chosen from a group comprising any one or more of: lateral displacement of the lens in a first dimension, lateral displacement of the lens in a second dimension perpendicular to the first dimension, lateral displacement of the lens in a third dimension perpendicular to the first dimension and perpendicular to the second dimension, angular displacement of the lens around a first axis wherein the first axis is aligned along a first dimension, angular displacement of the lens around a second axis wherein the second axis is aligned along a second dimension perpendicular to the first dimension, and angular displacement around of the lens around a third axis wherein the third axis is aligned along a third dimension perpendicular to the first dimension and perpendicular to the second dimension.

Method 500 may further comprise iteratively repeating the directing, the measuring and the determining whether to adjust a position of the at least one lens (112, 114, 116) or to fix the at least one lens (112, 114, 116) in a current position based at least one part on the measurement of the at least one property of the laser light (150, 151, 153) by the sensor (140) until the at least one property of the laser light (150, 151, 153) measured by the sensor (140) is in the specified range.

A person of skill in the art will appreciate that the various embodiments for aligning a lens in a laser projector described herein may be applied in non-WHUD applications. For example, the present systems, devices, and methods may be applied in non-wearable heads-up displays and/or in other applications that may or may not include a visible display.

In some implementations, one or more optical fiber(s) may be used to guide light signals along some of the paths illustrated herein.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. Nos. 14/155,087, 14/155,107, PCT Patent Application PCT/US2014/057029, and/or U.S. Provisional Patent Application Ser. No. 62/236,060, all of which are incorporated by reference herein in their entirety.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Provisional Patent Application Ser. No. 62/750,091, U.S. Patent Publication No. US 2015-0378161 A1, U.S. Non-Provisional patent application Ser. Nos. 15/046,234, 15/046,254, 15/046,269, U.S. Provisional Patent Application Ser. Nos. 62/156,736, 62/214,600, 62/167,767, U.S. Non-Provisional patent application Ser. Nos. 14/155,087, 14/155,107, 15/813,594, 16/142,391, 15/946,549, and 16/143,025 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method to perform alignment in a projector, the method comprising:
    directing laser light emitted by at least one laser light source to at least one lens;
    splitting, by a splitter, the laser light from the at least one lens into at least two portions of light, wherein each portion of light comprises an exit pupil;
    directing each portion of light to a diffractive optical element ("DOE") configured to diffract each portion of light to form a respective diffracted light;
    in response to a measured property of a respective diffracted light being outside a specified range, adjusting a position of the at least one lens based on a quality of the respective diffracted light; and
    in response to the measured property of a respective diffracted light being inside the specified range, fixing the at least one lens at a current position.

2. The method of claim 1, wherein:
    the DOE includes a hologram configured to apply a holographic optical function to one or more respective diffracted lights.

3. The method of claim 1 wherein adjusting a position of the at least one lens based on a quality of the respective diffracted light includes adjusting the position of the at least one lens to maximize a brightness of the respective diffracted light.

4. The method of claim 1 wherein adjusting a position of the at least one lens based on a quality of the respective diffracted light includes adjusting the position of the at least one lens to minimize a variation of a brightness of the respective diffracted light across a region of a light sensor.

5. The method of claim 1 wherein adjusting a position of the at least one lens based on a quality of the respective diffracted light includes adjusting the position of the at least one lens to maintain a brightness of the respective diffracted light within a brightness range, the brightness range delimited by a nominal minimum brightness and a nominal maximum brightness.

6. The method of claim 1, further comprising:
    directing the laser light from the at least one lens to a dynamic mirror; and
    directing the laser light from the dynamic mirror to the splitter.

7. The method of claim 1, further comprising:
    directing the laser light from by the at least one lens to a beam combiner;
    and directing the laser light by the beam combiner to the splitter.

8. A method to perform alignment in a projector, the method comprising:
    directing laser light emitted by at least one laser light source to at least one lens;
    sweeping the laser light from the at least one lens across a two-dimensional area of a diffractive optical element ("DOE"), wherein the DOE is configured to diffract the laser light by the two-dimensional area of the DOE to form a diffracted light;
    measuring a property of the diffracted light across a two-dimensional area of a light sensor;
    in response to a measured property of the diffracted light being outside a specified range, adjusting a position of the at least one lens based on a quality of the diffracted light and
    in response to the measured property of the diffracted light being inside the specified range, fixing the at least one lens at a current position.

9. The method of claim 8 wherein:
    the two-dimensional area of the light sensor comprises at least one set of pixels;
    each of the at least one set of pixels has a respective pixel resolution; and
    adjusting a position of the at least one lens based on a quality of the diffracted light includes adjusting the position of the at least one lens to maximize each pixel resolution of the at least one set of pixels.

10. The method of claim 8 wherein sweeping the laser light across a two-dimensional area of the DOE includes scanning a raster across the DOE, and wherein measuring a property of the diffracted light across a two-dimensional area of the light sensor includes measuring a property of the diffracted light scanned across the two-dimensional area of the light sensor as a raster.

11. The method of claim 8, wherein sweeping the laser light from the at least one lens across the two-dimensional area of the DOE comprises directing the laser light from the at least one lens to a dynamic mirror configured to sweep the laser light from the at least one lens across the two-dimensional area of the DOE.

12. The method of claim 8, wherein the DOE includes a hologram configured to apply a holographic optical function to the diffracted light.

13. The method of claim 8, wherein adjusting the position of the at least one lens based on a quality of the diffracted light includes adjusting the position of the at least one lens to maximize a brightness of the diffracted light.

14. A method to perform alignment in a projector, the method comprising:
    directing a first laser light emitted by a first laser light source to a first lens and a second laser light emitted by a second laser light source to a second lens;

diffracting, by a diffractive optical element ("DOE"), the first laser light from the first lens to form a first diffracted light and the second laser light from the second lens to form a second diffracted light;

measuring, by a light sensor, a property of the first diffracted light and a property of the second diffracted light;

adjusting a position of the first lens based on the measured property of the first diffracted light; and adjusting a position of the second lens based on the measured property of the second diffracted light.

15. The method of claim 14, wherein adjusting a position of the first lens based on the measured property of the first diffracted light comprises:

in response to the measured property of the first diffracted light being within outside a specified range, adjusting a current position of the first lens.

16. The method of claim 15, further comprising:

in response to the measured property of the first diffracted light being within the specified range, fixing the first lens in the current position of the first lens.

17. The method of claim 16, further comprising:

iteratively repeating measuring the property of the first diffracted light and adjusting the position of the first lens based on the measured property of the first diffracted light until the property of the first laser light is in the specified range.

18. The method of claim 14 wherein adjusting a position of the first lens includes adjusting the first lens in at least one manner selected from a group consisting of: lateral displacement of the first lens in a first dimension, lateral displacement of the first lens in a second dimension perpendicular to the first dimension, lateral displacement of the first lens in a third dimension perpendicular to the first dimension and perpendicular to the second dimension, angular displacement of the first lens around a first axis wherein the first axis is aligned along the first dimension, angular displacement of the first lens around a second axis wherein the second axis is aligned along the second dimension perpendicular to the first dimension, and angular displacement around of the first lens around a third axis wherein the third axis is aligned along the third dimension perpendicular to the first dimension and perpendicular to the second dimension.

19. The method of claim 14, wherein adjusting the position of the second lens based on the measured property of the second diffracted light comprises adjusting the position of the second lens to maximize an overlap between the first laser light and the second laser light.

20. The method of claim 14, wherein:

the first laser light comprises light of a first wavelength;

the second laser light comprises light of a second wavelength; and the DOE comprises a wavelength-multiplexed hologram configured to diffract the first laser light by the wavelength-multiplexed hologram to form the first diffracted light and diffract the second laser light by the wavelength-multiplexed hologram to form the second diffracted light.

* * * * *